(12) United States Patent
Guo et al.

(10) Patent No.: US 12,218,883 B2
(45) Date of Patent: Feb. 4, 2025

(54) METHOD FOR DETERMINING TRANSPORT BLOCK SIZE AND COMMUNICATION APPARATUS

(71) Applicant: Huawei Technologies Co., Ltd., Shenzhen (CN)

(72) Inventors: Wenting Guo, Shanghai (CN); Hongjia Su, Shanghai (CN); Zhengzheng Xiang, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/819,425

(22) Filed: Aug. 12, 2022

(65) Prior Publication Data

US 2022/0385436 A1 Dec. 1, 2022

Related U.S. Application Data

(63) Continuation of application No. PCT/CN2020/075364, filed on Feb. 14, 2020.

(51) Int. Cl.
*H04L 5/00* (2006.01)
*H04W 92/18* (2009.01)

(52) U.S. Cl.
CPC .......... *H04L 5/0091* (2013.01); *H04L 5/0048* (2013.01); *H04W 92/18* (2013.01)

(58) Field of Classification Search
CPC ..... H04L 5/0091; H04L 5/0048; H04W 92/18
See application file for complete search history.

(56) References Cited

U.S. PATENT DOCUMENTS

| 2016/0157217 | A1* | 6/2016 | Xue | H04W 72/044 370/330 |
|---|---|---|---|---|
| 2019/0045390 | A1 | 2/2019 | Davydov et al. | |
| 2019/0313426 | A1 | 10/2019 | Lin et al. | |

(Continued)

FOREIGN PATENT DOCUMENTS

| CN | 110291833 A | 9/2019 |
|---|---|---|
| CN | 110392431 A | 10/2019 |

(Continued)

OTHER PUBLICATIONS

"5G; NR; Physical layer procedures for data (3GPP TS 38.214 version 15.3.0 Release 15)", Technical Specification, ETSI TS 138 214 V15.3.0 (Oct. 2018), 99 Pages.

(Continued)

*Primary Examiner* — Ajay Cattungal
(74) *Attorney, Agent, or Firm* — Slater Matsil, LLP

(57) ABSTRACT

This application provides a method for determining a transport block size and a communication apparatus, which may be used in systems such as vehicle-to-everything, V2X, and V2V. A receive-end terminal device and a transmit-end terminal device may determine a quantity of encoded symbols based on a symbol length used for sidelink communication in a time unit and an scaling factor, and may further determine a transport block size of a data channel based on the quantity of encoded symbols. Therefore, for all slots used for sidelink communication, a same quantity of encoded symbols can be determined, and a same transport block size can be further determined.

21 Claims, 4 Drawing Sheets

(56) References Cited

U.S. PATENT DOCUMENTS

| | | | | |
|---|---|---|---|---|
| 2019/0379511 | A1* | 12/2019 | Xu | H04L 5/0046 |
| 2020/0128529 | A1* | 4/2020 | Wang | H04L 5/0091 |
| 2020/0351857 | A1* | 11/2020 | Bharadwaj | H04L 5/0051 |
| 2021/0136757 | A1* | 5/2021 | Guo | H04L 5/0044 |
| 2022/0086840 | A1* | 3/2022 | Gurelli | H04L 1/1671 |

FOREIGN PATENT DOCUMENTS

| | | |
|---|---|---|
| CN | 110611554 A | 12/2019 |
| CN | 110612688 A | 12/2019 |
| WO | 2019151915 A1 | 8/2019 |

OTHER PUBLICATIONS

Apple, "On NR V2X Physical Layer Structure", 3GPP TSG RAN WG1 #99, R1-1912810, Nov. 18-22, 2019, 15 Pages, Reno, USA.

NTT DOCOMO, Inc, "Sidelink physical layer structure for NR V2X", 3GPP TSG RAN WG1 #99, R1-1912880, Nov. 18-22, 2019, 16 Pages, Reno, US.

"3rd Generation Partnership Project; Technical Specification Group Radio Access Network; NR; Physical channels and modulation (Release 16)", 3GPP TS 38.211 V16.0.0, Technical Specification, Dec. 2019, 129 Pages.

"3rd Generation Partnership Project; Technical Specification Group Radio Access Network; NR; Multiplexing and channel coding (Release 16)", 3GPP TS 38.212 V16.0.0, Technical Specification, Dec. 2019, 145 Pages.

"3rd Generation Partnership Project; Technical Specification Group Radio Access Network; NR; Physical layer procedures for data (Release 16)", 3GPP TS 38.214 V16.0.0, Technical Specification, Dec. 2019, 148 Pages.

"3rd Generation Partnership Project; Technical Specification Group Services and System Aspects; Architecture enhancements for 5G System (5GS) to support Vehicle-to-Everything (V2X) services (Release 16)", 3GPP TS 23.287 V16.1.0, Technical Specification, Dec. 2019, 51 Pages.

"3rd Generation Partnership Project; Technical Specification Group Radio Access Network; NR; Radio Resource Control (RRC) protocol specification (Release 15)", 3GPP TS 38.331 V15.8.0, Technical Specification, Dec. 2019, 532 Pages.

Apple, "NR V2X Sidelink Physical Layer Procedures", 3GPP TSG RAN WG1 #98bis, R1-1910964, Oct. 14-20, 2019, 7 Pages, Chongqing, China.

Ericsson, "On TBS Determination and DL/UL Resource Allocation", 3GPP TSG RAN WG1 Meeting 91, R1-1719596, Nov. 27-Dec. 1, 2017, 12 Pages, Reno, USA.

Intel Corporation, "Sidelink physical structure for NR V2X communication", 3GPP TSG RAN WG1 Meeting #99, R1-1913255, revised R1-1912203, Nov. 18-22, 2019, 36 Pages, Reno, Nevada, USA.

Intel Corporation, "Sidelink physical structure for NR V2X communication", 3GPP TSG RAN WG1 Meeting #99, R1-1912203, Nov. 18-22, 2019, 34 Pages, Reno, Nevada, USA.

LG Electronics, "Discussion on physical layer structure for NR sidelink", 3GPP TSG RAN WG1 #99, R1-1912586, Nov. 18-22, 2019, 34 Pages, Reno, USA.

Samsung, "Feature lead summary#1 for agenda item 7.2.4.1 Physical layer structure for sidelink", 3GPP TSG RAN WG1 #99 Meeting, R1-1912457, Nov. 18-22, 2019, 32 Pages, Reno, USA.

Vivo, "Physical layer structure for NR sidelink", 3GPP TSG RAN WG1 #99 Meeting, R1-1912020, Nov. 18-20, 2019, 20 Pages, Reno, USA.

* cited by examiner

METHOD FOR DETERMINING TRANSPORT BLOCK SIZE AND COMMUNICATION APPARATUS

CROSS-REFERENCE TO RELATED APPLICATIONS

This application is a continuation of International Application No. PCT/CN2020/075364, filed on Feb. 14, 2020, the disclosure of which is hereby incorporated by reference in its entirety.

TECHNICAL FIELD

This application relates to the communication field, and more specifically, to a method for determining a transport block (TB) size and a communication apparatus.

BACKGROUND

In a new radio (NR) vehicle-to-everything (V2X) system, a transport block size needs to be calculated based on all available symbols in a sidelink (SL) slot. In addition, transport blocks used for initial transmission and retransmission may be combined together to obtain a combination gain, and it needs to be ensured that transport block sizes (TBSs) used for the initial transmission and the retransmission are the same. Therefore, to ensure that the transport block sizes used for the initial transmission and the retransmission are the same, it needs to be ensured that quantities of available symbols in slots used for the initial transmission and the retransmission are the same. However, in an actual communication system, quantities of available symbols in different slots are not exactly the same. This imposes a limitation on selection of a transmission resource, and a corresponding transmission delay is caused due to the limitation on the transmission resource.

SUMMARY

This application provides a method for determining a transport block size and a communication apparatus, which may be used in vehicle-to-everything, for example, V2X communication, long term evolution—vehicle (LTE-V), and vehicle-to-vehicle (V2V) communication, or may be used in fields such as intelligent driving and intelligent connected vehicles, to avoid a limitation on selection of a transmission resource and a resulting transmission delay.

According to a first aspect, a method for determining a transport block size is provided. The method includes: A first terminal device determines a quantity of encoded symbols based on a symbol length used for sidelink (SL) communication in a time unit and an scaling factor. The first terminal device determines a transport block size of a data channel based on the quantity of encoded symbols.

According to a second aspect, a method for determining a transport block size is provided. The method includes: A second terminal device determines a quantity of encoded symbols based on a symbol length used for sidelink (SL) communication in a time unit and an scaling factor. The second terminal device determines a transport block size of a data channel based on the quantity of encoded symbols.

The method in this application may be used in a device-to-device (D2D) scenario, and optionally, may be used in a V2X scenario. The first terminal device communicates with the second terminal device in a D2D manner, the first terminal device is a transmit end, and the second terminal device is a receive end.

In this application, the symbol length may be configured by a system. In addition, for a slot used for sidelink communication (namely, a slot in which symbols include a symbol used for sidelink communication), symbols used for sidelink communication in all slots have a same length.

In addition, during initial transmission and retransmission, the method in this application is used to determine a quantity of encoded symbols and a transport block size. In other words, in this application, scaling factors used for the initial transmission and the retransmission are the same, or quantities of encoded symbols used for the initial transmission and the retransmission are the same.

Optionally, the symbol may be an orthogonal frequency division multiplexing (OFDM) symbol.

Optionally, the scaling factor may be preconfigured, and the preconfiguration includes configuration configured by a network device or is subject to specification. There may be one or more preconfigured scaling factors.

Optionally, the scaling factor may alternatively be determined by the first terminal device.

In this application, the quantity of encoded symbols is used to determine a quantity of available resource elements (REs) of a data channel in a physical resource block (RB). The data channel may be a physical sidelink shared channel (PSSCH).

According to the method provided in this application, the quantity of encoded symbols is determined based on the symbol length used for sidelink communication in the time unit and the scaling factor, so that for all slots used for sidelink communication, a same quantity of encoded symbols can be determined, and a same transport block size can be further determined. In this way, initial transmission or retransmission of a transport block can be performed in each slot used for sidelink communication, to avoid a limitation on selection of a transmission resource and a resulting transmission delay in a conventional technology.

With reference to the first aspect and the second aspect, in some implementations of the first aspect and the second aspect, the quantity of encoded symbols satisfies:

$N_{symbl}^{sh'} = N_{symbl}^{sh} - l_\alpha$, where $N_{symbl}^{sh'}$ indicates the quantity of encoded symbols, $N_{symbl}^{sh}$ indicates the symbol length, and $l_\alpha$ indicates the scaling factor.

Based on this solution, the first terminal device may determine the quantity of encoded symbols based only on the symbol length and the scaling factor.

With reference to the first aspect and the second aspect, in some implementations of the first aspect and the second aspect, the quantity of encoded symbols satisfies:

$N_{symbl}^{sh'} = N_{symbl}^{sh} - l_\alpha$, where $N_{symbl}^{sh'}$ indicates the quantity of encoded symbols, $N_{symbl}^{sh}$ indicates a quantity of symbols other than the first symbol used for automatic gain control (AGC) and the last gap (GAP) symbol in symbols used for sidelink communication in a time unit, and $l_\alpha$ indicates the scaling factor.

With reference to the first aspect, in some implementations of the first aspect, the method may further include: The first terminal device sends first indication information to the second terminal device, where the first indication information is used to indicate a value of the scaling factor or an index of the scaling factor.

With reference to the second aspect, in some implementations of the second aspect, the method may further include: The second terminal device receives first indication information from the first terminal device, where the first indication information is used to indicate a value of the scaling factor or an index of the scaling factor.

Optionally, the first indication information may be carried in control information. The control information may be, for example, sidelink control information (SCI).

With reference to the first aspect and the second aspect, in some implementations of the first aspect and the second aspect, the quantity of encoded symbols satisfies:

$N_{syml}^{sh'} = N_{syml}^{sh} - k \cdot l_\alpha - 2$, where $N_{syml}^{sh'}$ indicates the quantity of encoded symbols, $N_{syml}^{sh}$ indicates the symbol length, $l_\alpha$ indicates the scaling factor, and k is equal to 0 or 1.

With reference to the first aspect and the second aspect, in some implementations of the first aspect and the second aspect, the quantity of encoded symbols satisfies:

$N_{syml}^{sh'} = N_{syml}^{sh} - l_\alpha$, where $N_{syml}^{sh'}$ indicates the quantity of encoded symbols, $N_{syml}^{sh}$ indicates a quantity of symbols other than the first symbol used for automatic gain control (AGC) and the last gap (GAP) symbol in symbols used for sidelink communication in a time unit, $l_\alpha$ indicates the scaling factor, and k is equal to 0 or 1.

With reference to the first aspect, in some implementations of the first aspect, the method may further include: The first terminal device sends second indication information to the second terminal device, where the second indication information is used to indicate a value of k.

With reference to the second aspect, in some implementations of the second aspect, the method may further include: The second terminal device receives second indication information from the first terminal device, where the second indication information is used to indicate a value of k.

In this application, a same value of k is used to determine the quantity of encoded symbols for the initial transmission and the quantity of encoded symbols for the retransmission.

Optionally, the second indication information may be carried in control information.

The control information may be, for example, SCI.

With reference to the first aspect and the second aspect, in some implementations of the first aspect and the second aspect, the scaling factor corresponds to a configured period of a physical sidelink feedback channel (PSFCH).

Based on this solution, the first terminal device and/or the second terminal device may determine the scaling factor based on the configured period of the PSFCH.

Optionally, if the configured period of the PSFCH is 1, $l_\alpha$ is 3 or 5;
if the configured period of the PSFCH is 2, $l_\alpha$ is 1, 2, or 3, or $l_\alpha$ is 3, 4, or 5;
if the configured period of the PSFCH is 4, $l_\alpha$ is 1, 2, or 3, or $l_\alpha$ is 3, 4, or 5; or
if the configured period of the PSFCH is N, $l_\alpha$ is 3/N or $$\frac{3}{N} + 2,$$

where N≠0.

Optionally, if no PSFCH is configured in the time unit, $l_\alpha = 0$.

According to a third aspect, a method for determining a transport block size is provided. The method includes: A network device sends indication information to a first terminal device and a second terminal device, where the indication information is used to indicate an scaling factor, or the indication information is used to indicate a correspondence between an scaling factor and a PSFCH, and the scaling factor is used to determine a quantity of encoded symbols.

According to the method provided in this application, the first terminal device and/or the second terminal device may determine the quantity of encoded symbols based on the scaling factor, so that for all slots used for sidelink communication, a same quantity of encoded symbols can be determined, and a same transport block size can be further determined. In this way, initial transmission or retransmission of a transport block can be performed in each slot used for sidelink communication, to avoid a limitation on selection of a transmission resource and a resulting transmission delay in a conventional technology.

According to a fourth aspect, a communication apparatus is provided, including each module or unit configured to perform the method in any one of the first aspect or the possible implementations of the first aspect, or each module or unit configured to perform the method in any one of the second aspect or the possible implementations of the second aspect.

According to a fifth aspect, a communication apparatus is provided, including a processor. The processor is coupled to a memory, and may be configured to execute instructions in the memory, so that the apparatus performs the method in any one of the first aspect or the possible implementations of the first aspect, or performs the method in any one of the second aspect or the possible implementations of the second aspect. Optionally, the apparatus further includes the memory. Optionally, the apparatus further includes an interface circuit, and the processor is coupled to the interface circuit.

According to a sixth aspect, a communication apparatus is provided, including each module or unit configured to perform the method in any one of the third aspect or the possible implementations of the third aspect.

According to a seventh aspect, a communication apparatus is provided, including a processor. The processor is coupled to a memory, and may be configured to execute instructions in the memory, so that the apparatus performs the method in any one of the third aspect or the possible implementations of the third aspect. Optionally, the apparatus further includes the memory. Optionally, the apparatus further includes an interface circuit, and the processor is coupled to the interface circuit.

According to an eighth aspect, a processor is provided, and includes an input circuit, an output circuit, and a processing circuit. The processing circuit is configured to: receive a signal by using the input circuit, and transmit a signal by using the output circuit, so that the processor performs the method in any one of the first aspect or the possible implementations of the first aspect, performs the method in any one of the second aspect or the possible implementations of the second aspect, or performs the method in any one of the third aspect or the possible implementations of the third aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a ninth aspect, a communication apparatus is provided, including a processor and a memory. The processor is configured to read instructions stored in the memory, and may receive a signal through a receiver, and transmit a signal through a transmitter, to perform the method in any one of the first aspect or the possible implementations of the first aspect, perform the method in any one of the second aspect or the possible implementations of the second aspect, or perform the method in any one of the third aspect or the possible implementations of the third aspect.

Optionally, there are one or more processors, and there are one or more memories.

Optionally, the memory may be integrated with the processor, or the memory and the processor are disposed separately.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

The processing apparatus according to the ninth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor, and exists independently.

According to a tenth aspect, an embodiment of this application provides a communication apparatus. The apparatus includes a processor and an interface circuit. The interface circuit is configured to: receive code instructions and transmit the code instructions to the processor. The processor is configured to run the code instructions, so that the apparatus performs the method in any one of the first aspect or the possible implementations of the first aspect, performs the method in any one of the second aspect or the possible implementations of the second aspect, or performs the method in any one of the third aspect or the possible implementations of the third aspect.

According to an eleventh aspect, a computer program product is provided. The computer program product includes a computer program (which may also be referred to as code or instructions). When the computer program is run, a computer is enabled to perform the method in any one of the first aspect or the possible implementations of the first aspect, perform the method in any one of the second aspect or the possible implementations of the second aspect, or perform the method in any one of the third aspect or the possible implementations of the third aspect.

According to a twelfth aspect, a readable medium is provided. The readable medium stores a computer program (which may also be referred to as code or instructions). When the computer program is run on a computer, the computer is enabled to perform the method in any one of the first aspect or the possible implementations of the first aspect, perform the method in any one of the second aspect or the possible implementations of the second aspect, or perform the method in any one of the third aspect or the possible implementations of the third aspect.

According to a thirteenth aspect, a communication system is provided, including the first terminal device and the second terminal device described above. Optionally, the communication system may further include the network device described above.

DETAILED DESCRIPTION OF ILLUSTRATIVE EMBODIMENTS

Figure 1:
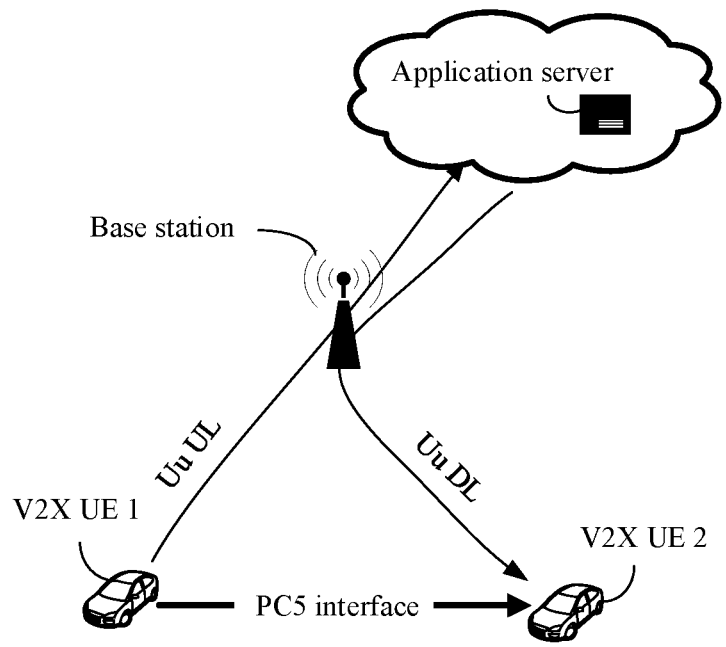
FIG. 1 is a schematic diagram of a V2X communication architecture according to this application.

The following describes the technical solutions in this application with reference to the accompanying drawings.

The technical solutions provided in this application may be used in a device-to-device (D2D) scenario, and optionally, may be used in a vehicle-to-everything (V2X) scenario. For example, the V2X scenario may be specifically any one of the following systems: vehicle-to-vehicle (V2V) communication, vehicle-to-pedestrian (V2P) communication, a vehicle-to-network (V2N) service and vehicle-to-infrastructure (V2I) communication.

For example, D2D may be long term evolution (LTE) D2D or new radio (NR) D2D, or may be D2D in another communication system that may appear as technologies develop. Similarly, V2X may be LTE V2X or NR V2X, or may be V2X in another communication system that may appear as technologies develop.

A terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

A network device in embodiments of this application is a base station, an evolved NodeB (eNodeB), a transmission reception point (TRP), a next generation NodeB (gNB) in a 5G mobile communication system, a base station in a future mobile communication system, an access node in a Wi-Fi system, or the like; or the network device may be a module or a unit that implements a part of functions of a base station, for example, may be a central unit (CU) or a distributed unit (DU). A specific technology and a specific device form that are used by the RAN device are not limited in embodiments of this application.

In embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). An operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communication software. In addition, a specific structure of an execution body of a method provided in embodiments of this application is not particularly limited in embodiments of this application provided that a program that records code for the method provided in embodiments of this application can be run to perform communication according to the method provided in embodiments of this application. For example, the method provided in embodiments of this application may be performed by the terminal device, the network device, or a functional module that is in the terminal device or the network device and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

FIG. 1 is a schematic diagram of a V2X communication architecture. As shown in FIG. 1, the architecture includes two types of communication interfaces: a PC5 interface and a Uu interface. The PC5 interface is a direct communication interface between V2X UEs (for example, V2X UE 1 and V2X UE 2 shown in the figure). A direct communication link between V2X UEs is also defined as a sidelink or a sidelink (SL). Uu interface communication is a communication mode in which sender V2X UE (for example, the V2X UE 1) sends V2X data to a base station through the Uu interface, the base station sends the data to a V2X application server for processing, the V2X application server delivers processed data to a base station, and then the base station sends the data to receiver V2X UE (for example, the V2X UE 2). In the Uu interface communication mode, a base station that forwards uplink data of the sender V2X UE to the application server and a base station that forwards downlink data delivered by the application server to the receiver V2X UE may be a same base station, or may be different base stations. This may be specifically determined by the application server. It should be understood that sending performed by the sender V2X UE to the base station is referred to as uplink (UL) transmission, and sending performed by the base station to the receiver V2X UE is referred to as downlink (DL) transmission.

In a current technology, to ensure that TBSs used for initial transmission and retransmission are the same, it needs to be ensured that quantities of available symbols in slots used for the initial transmission and the retransmission are the same. However, in an actual communication system, quantities of available symbols in different slots are not exactly the same. This imposes a limitation on selection of a transmission resource, and a corresponding transmission delay is caused due to the limitation on the transmission resource. For example, it is assumed that a quantity of available symbols in each of slots n, n+1, n+2, and n+4 is 12, a quantity of available symbols in a slot n+3 is 10, and the slot n may be used for initial transmission of a transport block. If three retransmissions need to be further performed, because the quantity of available symbols in the slot n+3 is different from the quantity of available symbols in each of the slots n, n+1, n+2, and n+4, retransmission can be performed only in the slots n+1, n+2, and n+4. Consequently, selection of a retransmission slot is limited. In addition, because the third retransmission cannot be performed in the slot n+3, and the third retransmission can be performed only in the slot n+4, a data transmission delay is also caused.

To resolve the foregoing problem, this application provides a method for determining a transport block size. The following describes the solution provided in this application.

Figure 2:
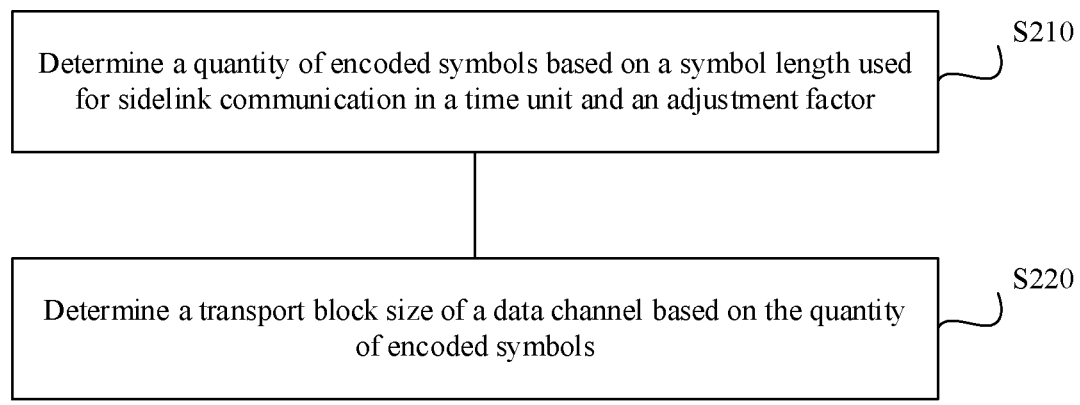
FIG. 2 is a schematic flowchart of a method for determining a transport block size according to this application.

FIG. 2 is a schematic flowchart of a method for determining a transport block size according to this application. The method 200 may be used at a transmit end, or may be used at a receive end. The transmit end and the receive end are two terminal devices that communicate with each other in a D2D manner. For example, the transmit end may be referred to as a first terminal device, and the receive end may be referred to as a second terminal device. The following describes steps in the method 200.

S210: Determine a quantity of encoded symbols based on a symbol length used for sidelink communication in a time unit and an scaling factor.

The time unit may be a slot, and the symbol length is a quantity of symbols used only for sidelink communication in a slot. For example, only six symbols in a slot are used for sidelink communication. In this case, the symbol length is 6.

Alternatively, the time unit may be a time unit formed by a symbol used for sidelink communication in a slot. In this case, the symbol length is a length of the time unit. For example, only six symbols in a slot are used for sidelink communication. In this case, the symbol length is 6, and the time unit is a time unit formed by the six symbols.

Figure 3:
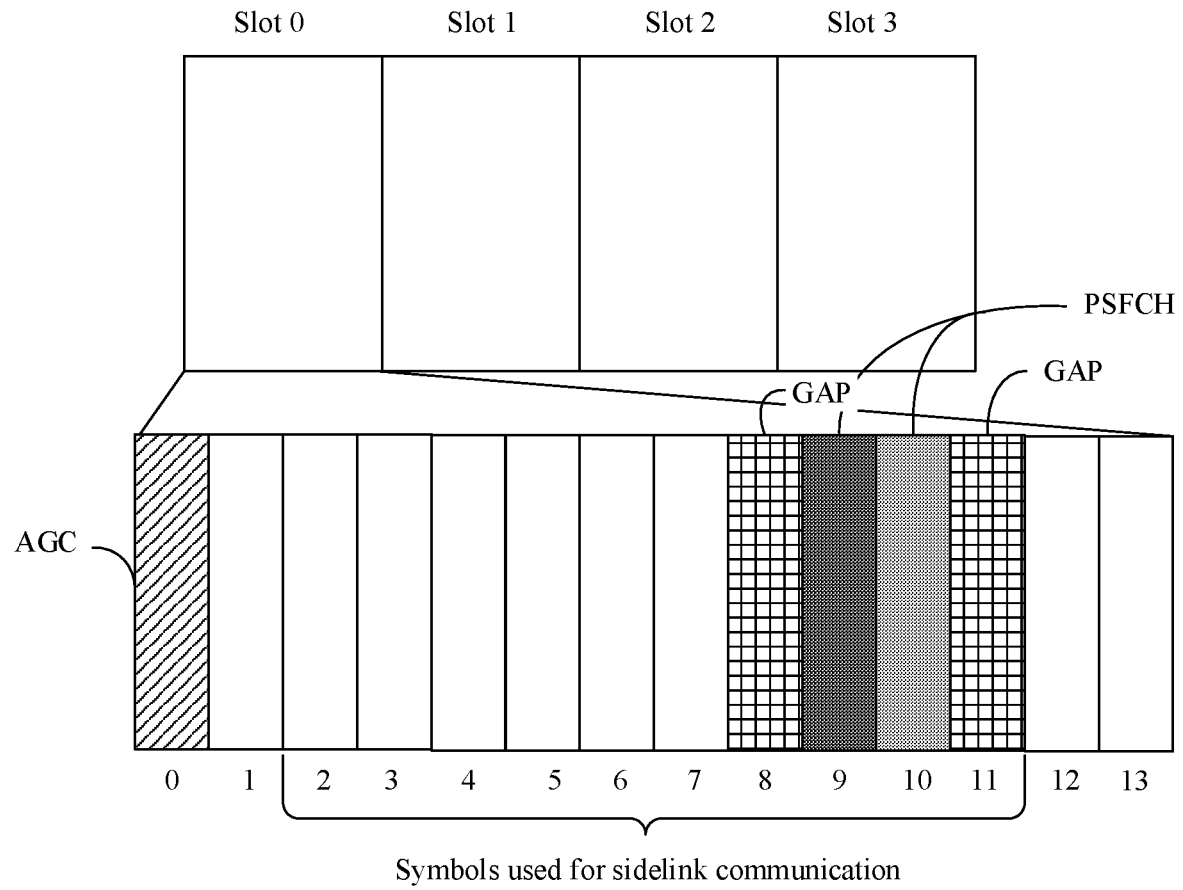
FIG. 3 is a schematic structural diagram of a slot according to this application.

For example, with reference to FIG. 3, a slot such as a slot 0 in FIG. 3 is used as an example. Symbols used for sidelink communication in the slot 0 are a symbol 2 to a symbol 11. In this case, the symbol length is 10. The slot 0 may be referred to as a time unit, or the symbol 2 to the symbol 11 may be referred to as a time unit, and a length of the time unit is 10 symbols.

In this application, the symbol length may be configured by a system. In addition, for a slot used for sidelink communication (namely, a slot in which symbols include a symbol used for sidelink communication), symbols used for sidelink communication in all slots have a same length.

Similarly, with reference to FIG. 3, for example, all slots 0, 1, 2, and 3 include symbols used for sidelink communication. In this case, a length of the symbols used for sidelink communication in each of the slots 0, 1, 2, and 3 is 10. For another example, all slots 0, 1, and 3 include symbols used for sidelink communication. In this case, a length of the symbols used for sidelink communication in each of the slots 0, 1, and 3 is 10.

The symbol in this application may be an OFDM symbol, but this is not limited in this application.

In addition, in this application, scaling factors used for initial transmission and retransmission are the same; in other words, quantities of encoded symbols used for the initial transmission and the retransmission are the same.

The following describes how to determine the quantity of encoded symbols based on the symbol length and the scaling factor.

Manner 1

The transmit end or the receive end may determine the quantity of encoded symbols only by learning of the symbol length and the scaling factor.

EXAMPLE 1

The quantity of encoded symbols satisfies the following formula (1):

$$N_{syml}^{sh'} = N_{syml}^{sh} - l_\alpha \quad (1),$$

where $N_{syml}^{sh'}$ indicates the quantity of encoded symbols, $N_{syml}^{sh}$ indicates a quantity of symbols other than the first symbol used for AGC and the last GAP symbol in symbols used for sidelink communication in a time unit, and $l_\alpha$ indicates the scaling factor.

That is, $N_{syml}^{sh} = N_{syml} - 2$, and $N_{syml}^{sh'} = N_{syml}^{sh} - l_\alpha$, or $N_{syml}^{sh'} = N_{syml} - 2 - l_\alpha$. $N_{syml}$ indicates the symbol length.

It should be understood that, in the example 1, the symbols used for sidelink communication in the time unit include the first symbol used for AGC and the last GAP symbol. For example, the first symbol used for AGC may be an AGC symbol used for a control channel and/or a data channel. In this application, the data channel may be a PSSCH, and the control channel may be a PSCCH.

In addition, the first symbol used for AGC may be the first symbol in the symbols used for sidelink communication in the time unit, or may not be the first symbol in the symbols used for sidelink communication in the time unit. Similarly, the last GAP symbol may be the last symbol in the symbols used for sidelink communication in the time unit, or may not be the last symbol in the symbols used for sidelink communication in the time unit.

It should be further understood that the symbols used for sidelink communication in the time unit may further include an AGC symbol other than the first symbol used for AGC and/or a GAP symbol other than the last GAP symbol. For example, one time unit is one slot, and the slot 0 shown in FIG. 3 is used as an example. The symbols used for sidelink communication in the slot 0 are the symbol 2 to the symbol 11, the symbol 2 is the first symbol used for AGC, the symbol 11 is the last GAP symbol, and the symbol 8 is also a GAP symbol. In addition, the symbol 9 and the symbol 10 may be symbols used to transmit a PSFCH.

A person skilled in the art may understand that, considering that a quantity of sending users in each slot in a D2D system is uncertain, that is, the receive end cannot predict a quantity of users sending information that can be received in each slot, a receive power in each slot is different. To be specific, the receive end needs to adjust a radio frequency amplification coefficient when receiving data in each slot, to obtain an optimal analog (A)/digital (D) conversion effect. This function is an AGC function.

EXAMPLE 2

The quantity of encoded symbols satisfies the following formula (2):

$$N_{syml}^{sh'} = N_{syml}^{sh} - l_\alpha \quad (2),$$

where $N_{syml}^{sh'}$ indicates the quantity of encoded symbols, $N_{syml}^{sh}$ indicates the symbol length, and $l_\alpha$ indicates the scaling factor.

For example, the manner 1 may be used in a plurality of scenarios.

Scenario 1: One scaling factor is preconfigured at both the transmit end and the receive end, that is, $l_\alpha$ has only one value.

In this scenario, the transmit end and the receive end may determine $N_{syml}^{sh'}$ based on unique values of $N_{syml}^{sh}$ and $l_\alpha$.

Scenario 2: A plurality of scaling factors are preconfigured at both the transmit end and the receive end, that is, $l_\alpha$ has a plurality of values.

In this scenario, the transmit end may first determine a value of $l_\alpha$, and then notify the receive end of the determined value of $l_\alpha$.

For example, the transmit end may indicate the value of $l_\alpha$ by sending first indication information to the receive end.

For example, the first indication information may specifically indicate the value of $l_\alpha$ or an index corresponding to the value of $l_\alpha$. For example, $l_\alpha$ has a plurality of values such as 1, 2, and 3, and each value corresponds to one index. For example, indexes corresponding to 1, 2, and 3 are 0, 1, and 2 respectively. In this case, if the first indication information indicates the index 0, $l_\alpha=1$ may be determined.

Optionally, the first indication information may be sent by using control information. For example, the control information may be SCI.

Scenario 3: An scaling factor is not preconfigured at the transmit end or the receive end, and the transmit end notifies the receive end of the scaling factor after autonomously determining $l_\alpha$.

Similarly, the transmit end may alternatively indicate a value of $l_\alpha$ by sending first indication information to the receive end.

In the scenario 2 and the scenario 3, values of $l_\alpha$ used for the initial transmission and the retransmission are indicated by the transmit end. In addition, the transmit end indicates that the value of $l_\alpha$ used for the initial transmission is the same as the value of $l_\alpha$ used for the retransmission. For example, if the value of $l_\alpha$ used for the initial transmission is indicated by using the first indication information, the value of $l_\alpha$ used for the retransmission is indicated by using the first indication information.

In this application, the preconfiguration may refer to a protocol specification, or may refer to preconfiguration performed by a network device.

It should be understood that the foregoing scenarios may be used separately, or may be used in combination.

Optionally, in this application, the scaling factor may correspond to a configured period of a PSFCH.

For example, Table 1 and Table 2 each show a correspondence between an scaling factor and a configured period of a PSFCH. The correspondence shown in Table 1 may be used in the formula (1), and the correspondence shown in Table 2 may be used in the formula (2).

TABLE 1

| Configured period of a PSFCH | Scaling factor ($l_\alpha$) |
| --- | --- |
| 0 | 0 |
| 1 | 3 |
| 2 | {1, 2, 3} |
| 4 | {1, 2, 3} |

TABLE 2

| Configured period of a PSFCH | Scaling factor ($l_\alpha$) |
| --- | --- |
| 0 | 2 |
| 1 | 5 |
| 2 | {3, 4, 5} |
| 4 | {3, 4, 5} |

In this application, the configured period of the PSFCH is in a unit of a slot. For example, that the configured period of the PSFCH is 0 means that no symbol used to transmit the PSFCH is configured in each slot used for sidelink communication. That the configured period of the PSFCH is 1 means that each slot used for sidelink communication includes a symbol used to transmit the PSFCH. That the configured period of the PSFCH is 2 means that for slots used for sidelink communication, a symbol used to transmit the PSFCH is configured at an interval of one slot. For example, assuming that slots 0, 1, 3, 4, and 6 are slots used for sidelink communication, if the configured period of the PSFCH is 2, slots 0, 3, and 6 each include a symbol used to transmit the PSFCH.

It should be understood that a time-frequency resource corresponding to the PSFCH is used by the receive end to feed back whether a transport block sent by the transmit end is correctly received. The configured period of the PSFCH may be configured by the network device.

Some examples are used for description with reference to Table 1, Table 2, and the foregoing three scenarios.

For example, in the scenario 1, if the scaling factor corresponds to the configured period of the PSFCH, it may be defined that when the configured period of the PSFCH is fixed, there is only one value of $l_\alpha$ in a time period.

For example, if $l_\alpha$ is $l_\alpha$ in the formula (1), the network device may configure a correspondence shown in Table 3 in a time period. In this way, both the transmit end and the receive end may determine the value of $l_\alpha$ based on the configured period of the PSFCH and Table 3. The network device may configure a correspondence shown in Table 4 or Table 5 in another time period. Similarly, both the transmit end and the receive end may determine the value of $l_\alpha$ based on the configured period of the PSFCH and Table 4 or Table 5. Alternatively, a protocol may specify the correspondence shown in Table 3, Table 4, or Table 5. In this way, the transmit end and the receive end may determine the value of $l_\alpha$ based on the configured period of the PSFCH.

TABLE 3

| Configured period of a PSFCH | Scaling factor ($l_\alpha$) |
| --- | --- |
| 0 | 0 |
| 1 | 3 |
| 2 | 2 |
| 4 | 2 |

TABLE 4

| Configured period of a PSFCH | Scaling factor ($l_\alpha$) |
| --- | --- |
| 0 | 0 |
| 1 | 3 |
| 2 | 3 |
| 4 | 2 |

TABLE 5

| Configured period of a PSFCH | Scaling factor ($l_\alpha$) |
| --- | --- |
| 0 | 0 |
| 1 | 3 |
| 2 | 2 |
| 4 | 1 |

For another example, if $l_\alpha$ is $l_\alpha$ in the formula (2), the network device may configure a correspondence shown in Table 6 in a time period. In this way, both the transmit end and the receive end may determine the value of $l_\alpha$ based on the configured period of the PSFCH and Table 6. The network device may configure a correspondence shown in Table 7 or Table 8 in another time period. Similarly, both the transmit end and the receive end may determine the value of $l_\alpha$ based on the configured period of the PSFCH and Table 7 or Table 8. Alternatively, the protocol may specify the correspondence shown in Table 6, Table 7, or Table 8. In this way, the transmit end and the receive end may determine the value of $l_\alpha$ based on the configured period of the PSFCH.

TABLE 6

| Configured period of a PSFCH | Scaling factor ($l_\alpha$) |
| --- | --- |
| 0 | 2 |
| 1 | 5 |
| 2 | 4 |
| 4 | 4 |

TABLE 7

| Configured period of a PSFCH | Scaling factor ($l_\alpha$) |
| --- | --- |
| 0 | 2 |
| 1 | 5 |
| 2 | 5 |
| 4 | 4 |

TABLE 8

| Configured period of a PSFCH | Scaling factor ($l_\alpha$) |
| --- | --- |
| 0 | 2 |
| 1 | 5 |
| 2 | 4 |
| 4 | 3 |

It should be understood that the correspondences shown in Table 1 to Table 8 are merely examples, and the examples should not constitute any limitation on this application.

In the scenario 2, if the scaling factor corresponds to the configured period of the PSFCH, it may be defined that when the configured period of the PSFCH is fixed, there may be one or more values of $l_\alpha$ in a time period.

For example, if $l_\alpha$ is $l_\alpha$ in the formula (1), the correspondence shown in Table 1 may be preconfigured. In this way, if the configured period of the PSFCH is 0 or 1, the transmit end and the receive end may determine the value of $l_\alpha$ based on Table 1. If the configured period of the PSFCH is 2 or 4, the transmit end may determine a value from 1, 2, and 3, and notify the receive end of the determined value.

For another example, if $l_\alpha$ is $l_\alpha$ in the formula (2), the correspondence shown in Table 2 may be preconfigured. In this way, if the configured period of the PSFCH is 0 or 1, the transmit end and the receive end may determine the value of $l_\alpha$ based on Table 1. If the configured period of the PSFCH is 2 or 4, the transmit end may determine a value from 3, 4, and 5, and notify the receive end of the determined value.

In the scenario 3, if the scaling factor corresponds to the configured period of the PSFCH, it may be defined that when the configured period of the PSFCH is fixed, there may be one or more values of $l_\alpha$, or there is only one value of $l_\alpha$.

For example, the correspondence shown in Table 1 or Table 3 may be preconfigured. After determining the value of $l_\alpha$ based on the configured period of the PSFCH, the transmit end notifies the receive end of the value.

Optionally, the correspondence between the scaling factor and the configured period of the PSFCH satisfies $l_\alpha = 3/N$, or the correspondence between the scaling factor and the configured period of the PSFCH satisfies $$l_\alpha = \frac{3}{N} + 2.$$

N is the configured period of the PSFCH, and N≠0.

Optionally, if N=0, $l_\alpha$=0 or 2.

For example, if $l_\alpha$ is $l_\alpha$ in the formula (1), $l_\alpha$=3/N. If $l_\alpha$ is $l_\alpha$ in the formula (2), $$l_\alpha = \frac{3}{N} + 2.$$

For example, if $l_\alpha$ is $l_\alpha$ in the formula (1), $l_\alpha$=0. If $l_\alpha$ is $l_\alpha$ in the formula (2), $l_\alpha$=2.

This solution is applicable to the scenario 1 and the scenario 3.

Manner 2

The transmit end and the receive end may determine the quantity of encoded symbols based on the symbol length, the scaling factor, and an adjustment coefficient.

In other words, the transmit end and the receive end may first determine whether to use the scaling factor. If the scaling factor is used, the quantity of encoded symbols is determined based on the symbol length. If the scaling factor is not used, the quantity of encoded symbols is determined based on the symbol length and the scaling factor.

EXAMPLE 1

The quantity of encoded symbols satisfies the following formula (3):

$$N_{syml}^{sh'} = N_{syml}^{sh} - k \cdot l_\alpha \qquad (3),$$

where $N_{syml}^{sh'}$ indicates the quantity of encoded symbols, $N_{syml}^{sh}$ indicates a quantity of symbols other than the first symbol used for AGC and the last GAP symbol in symbols used for sidelink communication in a time unit, $l_\alpha$ indicates the scaling factor, and k is equal to 0 or 1. k may also be referred to as the adjustment coefficient.

It may be understood that, in the formula (3), meanings of the parameters except k are the same as meanings of corresponding parameters in the formula (1).

The formula (3) may also be equivalent to $$\begin{cases} N_{syml}^{sh'} = N_{syml}^{sh} - l_\alpha, \\ N_{syml}^{sh'} = N_{syml}^{sh}, \end{cases}$$

wherein, if the scaling factor is used, the formula $N_{syml}^{sh'} = N_{syml}^{sh} - l_\alpha$ is used. If the scaling factor is not used, the formula $N_{syml}^{sh'} = N_{syml}^{sh}$ is used.

EXAMPLE 2

The quantity of encoded symbols satisfies the following formula (4):

$$N_{syml}^{sh'} = N_{syml}^{sh} - k \cdot l_\alpha - 2 \qquad (4),$$

where $N_{syml}^{sh'}$ indicates the quantity of encoded symbols, $N_{syml}^{sh}$ indicates the symbol length, $l_\alpha$ indicates the scaling factor, and k is equal to 0 or 1. k may also be referred to as the adjustment coefficient.

It may be understood that, in the formula (4), meanings of the parameters except k are the same as meanings of corresponding parameters in the formula (2).

The formula (4) may also be equivalent to $$\begin{cases} N_{syml}^{sh'} = N_{syml}^{sh} - l_\alpha - 2, \\ N_{syml}^{sh'} = N_{syml}^{sh} - 2, \end{cases}$$

wherein if the scaling factor is used, the formula $N_{syml}^{sh'} = N_{syml}^{sh} - l_\alpha - 2$ is used. If the scaling factor is not used, the formula $N_{syml}^{sh'} = N_{syml}^{sh} - 2$ is used.

In the manner 2, a value of k may be determined by the transmit end, and may be notified by the transmit end to the receive end. For example, the transmit end may send second indication information to the receive end, where the second indication information indicates the value of k.

Optionally, the second indication information may be sent by using control information. For example, the control information may be SCI.

In this application, a same value of k is used for the initial transmission and the retransmission to determine the quantity of encoded symbols.

It may be understood that values of k used for the initial transmission and the retransmission are indicated by the transmit end. In addition, the transmit end indicates that the value of k used for the initial transmission is the same as the value of k used for the retransmission. For example, if the value of k used for the initial transmission is indicated by using the second indication information, the value of k used for the retransmission is indicated by using the second indication information.

The manner 2 may be used in the scenario 1 and the scenario 3. When the manner 2 is used in the scenario 3, the transmit end may notify the receive end of the value of $l_\alpha$.

For example, in the manner 2, $l_\alpha$ may correspond to the configured period of the PSFCH.

For example, a correspondence between $l_\alpha$ and a configured period of a PSFCH may be that shown in any one of Table 3 to Table 8. For example, if $l_\alpha$ is $l_\alpha$ in the formula (3), the correspondence between $l_\alpha$ and the configured period of the PSFCH may be that shown in Table 3, Table 4, or Table 5. If $l_\alpha$ is $l_\alpha$ in the formula (4), the correspondence between $l_\alpha$ and the configured period of the PSFCH may be that shown in Table 6, Table 7, or Table 8.

For another example, the correspondence between $l_\alpha$ and the configured period of the PSFCH may satisfy $l_\alpha=N$ is the configured period of the PSFCH, and $N \neq 0$.

For another example, if $N=0$, $l_\alpha=0$.

S220: Determine a transport block size of a data channel based on the quantity of encoded symbols.

For example, the quantity of encoded symbols in this application is used to determine a quantity of available REs of the data channel in an RB.

In a conventional technology, a quantity of available REs of a physical downlink shared channel (PDSCH) in an RB satisfies a formula (5):

$$N_{RE}'=N_{SC}^{RB} \cdot N_{syml}^{sh} - N_{DMRS}^{PRB} - N_{oh}^{PRB} \qquad (5), \text{ where}$$

$N_{RE}'$ indicates the quantity of available REs of the PDSCH in the RB, $N_{SC}^{RB}=12$ indicates that one RB has 12 subcarriers, $N_{syml}^{sh}$ indicates a quantity of symbols allocated to the PDSCH in a slot, $N_{DMRS}^{PRB}$ indicates an overhead of a demodulation reference signal (DMRS) within duration of the PDSCH in the RB, and $N_{oh}^{PRB}$ may be configured by a higher layer. After $N_{RE}$ is obtained, the transport block size may be determined based on $N_{RE}$. For details, refer to the conventional technology.

A function of the quantity $N_{syml}^{sh'}$ of available encoded symbols in this application is the same as a function of $N_{syml}^{sh}$ in the formula (5). In this application, the quantity of available REs of the data channel in the RB satisfies a formula (6):

$$N_{RE}'=N_{SC}^{RB} \cdot N_{syml}^{sh'} - N_{DMRS}^{PRB} - N_{oh}^{PRB} \qquad (6), \text{ where}$$

$N_{RE}'$ indicates the quantity of available REs of the data channel in the RB, $N_{SC}^{RB}=12$ indicates that one PRB has 12 subcarriers, $N_{DMRS}^{PRB}$ indicates a quantity of REs of a DMRS on an encoded symbol in the RB, and $N_{oh}^{PRB}$ may be configured by a higher layer After $N_{RE}'$ is obtained, the transport block size may be determined based on the conventional technology. For details, refer to 5.1.3.2 in TS38.214.

Optionally, the method may further include: The transmit end sends the transport block based on the transport block size. Correspondingly, the receive end receives the transport block based on the transport block size, that is, the receive end performs channel decoding on the transport block.

In conclusion, according to the method provided in this application, the quantity of encoded symbols is determined based on the symbol length used for sidelink communication in the time unit and the scaling factor, so that for all slots used for sidelink communication, a same quantity of encoded symbols can be determined, and a same transport block size can be further determined. In this way, initial transmission or retransmission of the transport block can be performed in each slot used for sidelink communication, to avoid a limitation on selection of a transmission resource and a resulting transmission delay in the conventional technology.

The foregoing describes in detail the method provided in embodiments of this application with reference to FIG. 2 and FIG. 3. The following describes in detail apparatuses provided in embodiments of this application with reference to FIG. 4 to FIG. 6.

Figure 4:
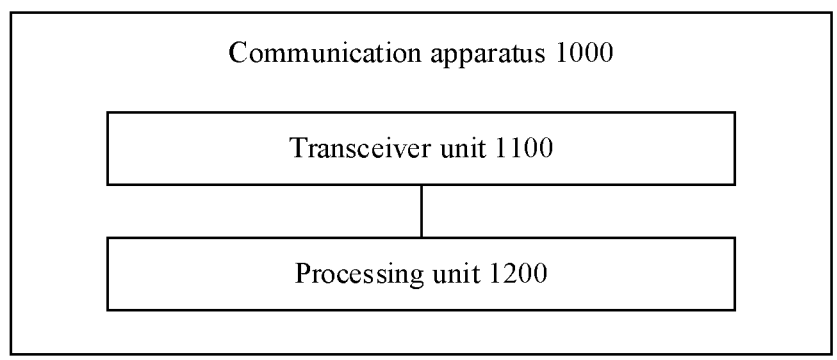
FIG. 4 is a schematic structural diagram of a communication apparatus according to this application.

FIG. 4 is a schematic block diagram of a communication apparatus according to an embodiment of this application. As shown in FIG. 4, the communication apparatus woo may include a processing unit 1200. Optionally, the communication apparatus may further include a transceiver unit 1100.

The transceiver unit 1100 may be configured to send information to another apparatus or receive information from another apparatus, for example, send or receive first indication information. The processing unit 1200 may be configured to perform internal processing of the apparatus to determine a quantity of encoded symbols.

In an implementation, the communication apparatus woo may correspond to a transmit end (namely, a first terminal device). The communication apparatus woo may be a terminal device or a chip configured in the terminal device, and may include units configured to perform operations performed by the terminal device. In addition, the units in the communication apparatus woo are separately configured to implement the operations performed by the transmit end in the foregoing method.

Specifically, the processing unit 1200 is configured to: determine a quantity of encoded symbols based on a symbol length used for sidelink communication in a time unit and an scaling factor; and determine a transport block size of a data channel based on the quantity of encoded symbols.

Optionally, the quantity of encoded symbols satisfies:

$$N_{syml}^{sh'}=N_{syml}^{sh}-l_\alpha, \qquad \text{where}$$

$N_{syml}^{sh'}$ indicates the quantity of encoded symbols, $N_{syml}^{sh}$ indicates the symbol length, and $l_\alpha$ indicates the scaling factor.

Optionally, the transceiver unit 1100 is configured to send first indication information to a receive end, where the first indication information is used to indicate a value of the scaling factor or an index of the scaling factor.

Optionally, the first indication information is carried in control information.

Optionally, the quantity of encoded symbols satisfies:

$$N_{syml}^{sh'}=N_{syml}^{sh}-k \cdot l_\alpha, \qquad \text{where}$$

$N_{syml}^{sh'}$ indicates the quantity of encoded symbols, $N_{syml}^{sh}$ indicates the symbol length, $l_\alpha$ indicates the scaling factor, and k is equal to 0 or 1.

Optionally, the transceiver unit 1100 is configured to send second indication information to a receive end, where the second indication information is used to indicate a value of k.

Optionally, the second indication information is carried in control information.

Optionally, the scaling factor is preconfigured.

Optionally, the scaling factor corresponds to a configured period of a PSFCH.

In another implementation, the communication apparatus woo may correspond to a receive end (namely, a second terminal device). The communication apparatus woo may be a terminal device or a chip configured in the terminal device, and may include units configured to perform operations performed by the terminal device. In addition, the units in the communication apparatus woo are separately configured to implement the operations performed by the receive end in the foregoing method.

Specifically, the processing unit 1200 is configured to: determine a quantity of encoded symbols based on a symbol length used for sidelink communication in a time unit and an scaling factor; and determine a transport block size of a data channel based on the quantity of encoded symbols.

Optionally, the quantity of encoded symbols satisfies:

$$N_{syml}^{sh'}=N_{syml}^{sh}\cdot k\cdot l_\alpha,\qquad\text{where}$$

$N_{syml}^{sh'}$ indicates the quantity of encoded symbols, $N_{syml}^{sh}$ indicates the symbol length, and $l_\alpha$ indicates the scaling factor.

Optionally, the transceiver unit 1100 is configured to receive first indication information from the receive end, where the first indication information is used to indicate a value of the scaling factor or an index of the scaling factor.

Optionally, the first indication information is carried in control information.

Optionally, the quantity of encoded symbols satisfies:

$$N_{syml}^{sh'}=N_{syml}^{sh}-k\cdot l_\alpha,\qquad\text{where}$$

$N_{syml}^{sh'}$ indicates the quantity of encoded symbols, $N_{syml}^{sh}$ indicates the symbol length, $l_\alpha$ indicates the scaling factor, and k is equal to 0 or 1.

Optionally, the transceiver unit 1100 is configured to receive second indication information from the receive end, where the second indication information is used to indicate a value of k.

Optionally, the second indication information is carried in control information.

Optionally, the scaling factor is preconfigured.

Optionally, the scaling factor corresponds to a configured period of a PSFCH.

In still another implementation, the communication apparatus woo may correspond to a network device in the foregoing method embodiment. The communication apparatus woo may be a network device or a chip configured in the network device, and may include units configured to perform operations performed by the network device. In addition, the units in the communication apparatus woo are separately configured to implement the operations performed by the network device in the foregoing method.

In an embodiment, the transceiver unit 1100 is configured to send indication information to a receive end and a transmit end, where the indication information is used to indicate an scaling factor.

In another embodiment, the transceiver unit 1100 is configured to send indication information to the receive end and the transmit end, where the indication information is used to indicate a correspondence between an scaling factor and a PSFCH.

It should be understood that a specific process in which the units perform the foregoing corresponding steps of the corresponding network element has been described in detail in the foregoing method embodiment. For brevity, details are not described herein again.

Figure 5:
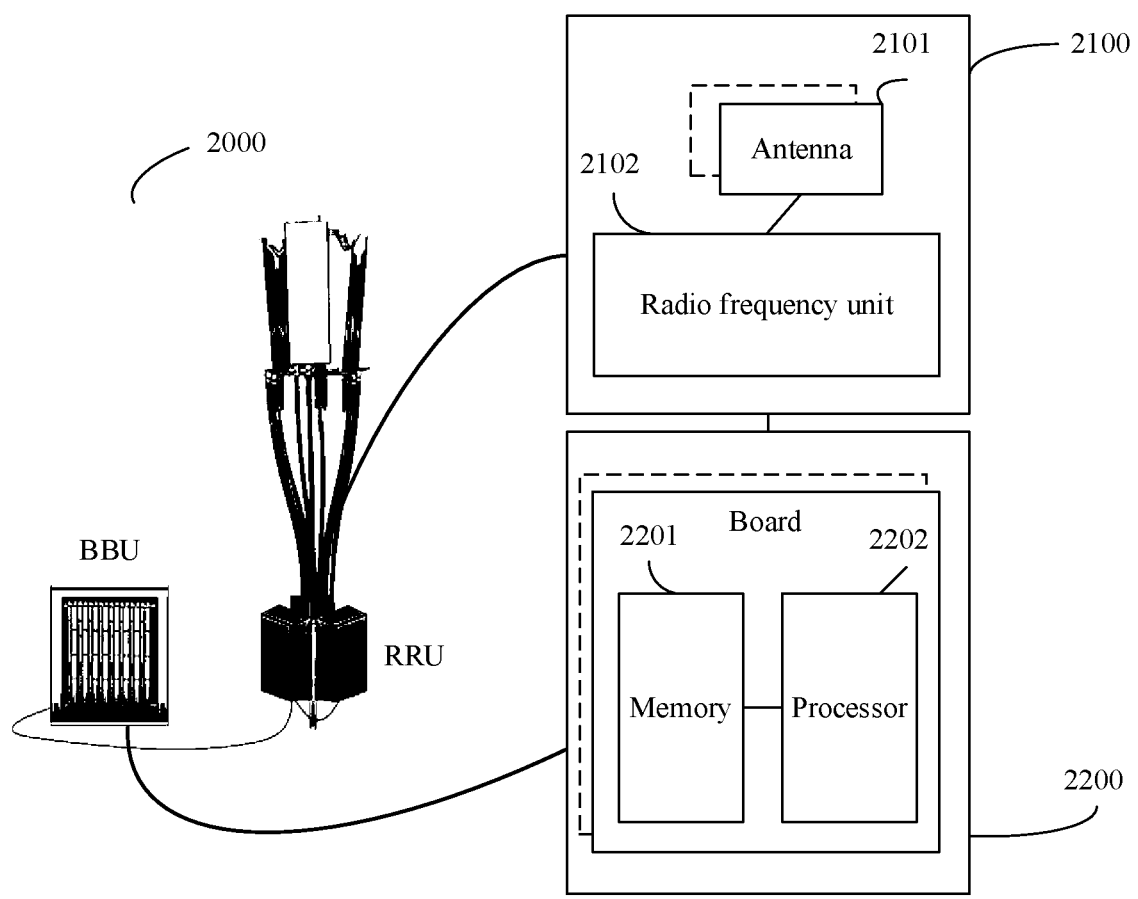
FIG. 5 is a schematic structural diagram of a network device according to this application.

It should be further understood that, when the communication apparatus woo is the network device, the transceiver unit 1100 in the communication apparatus woo may correspond to an RRU 2100 in the network device 2000 shown in FIG. 5, and the processing unit 1200 in the communication apparatus woo may correspond to a BBU 2200 in the network device 2000 shown in FIG. 5. When the communication apparatus woo is the chip configured in the network device, the transceiver unit 1100 in the communication apparatus woo may be an input/output interface.

Figure 6:
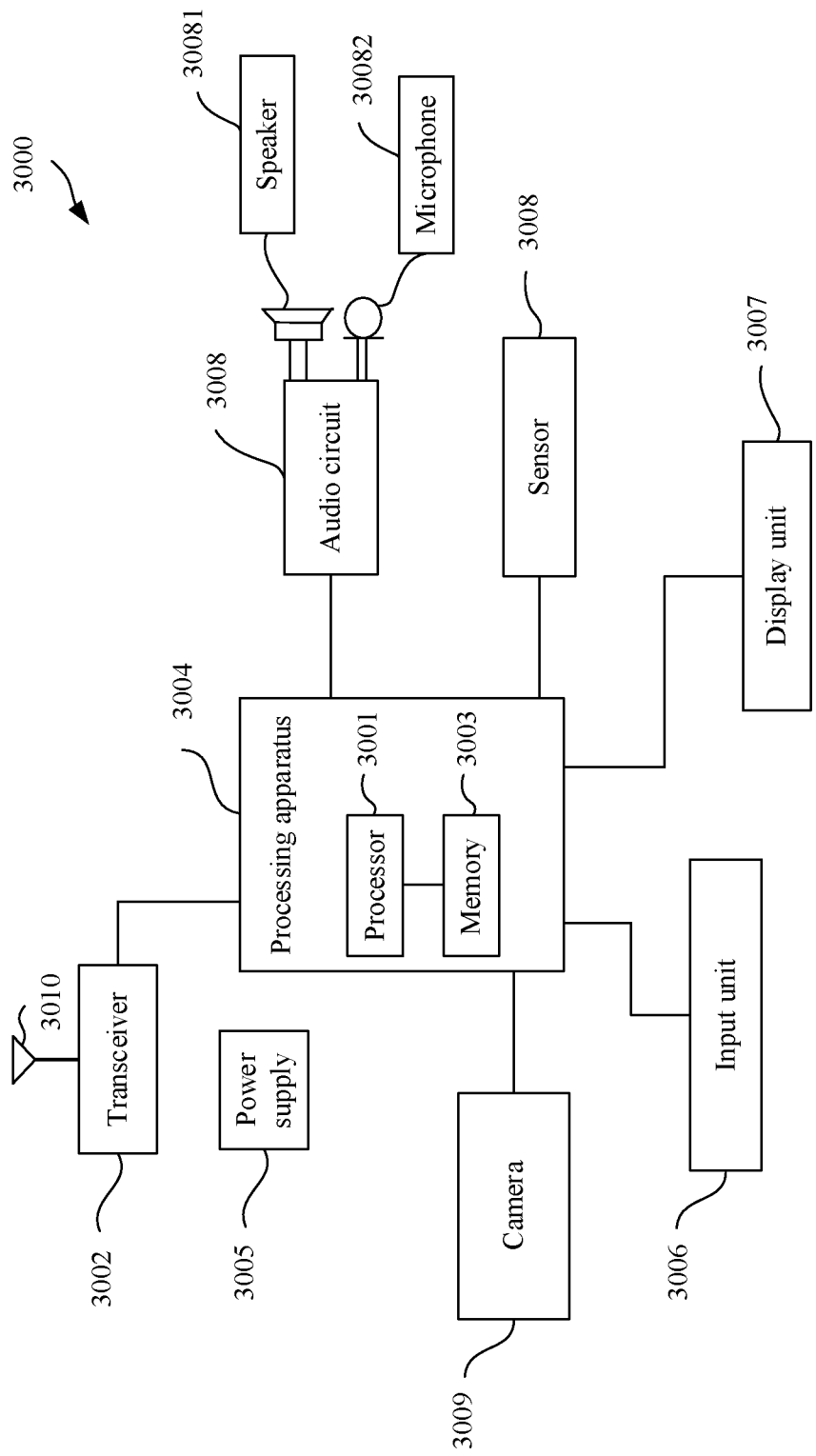
FIG. 6 is a schematic structural diagram of a terminal device according to this application.

It should be further understood that, when the communication apparatus woo is the terminal device, the transceiver unit 1100 in the communication apparatus woo may correspond to a transceiver 3002 in a terminal device 3000 shown in FIG. 6, and the processing unit 1200 in the communication apparatus moo may correspond to a processor 3001 in the terminal device 3000 shown in FIG. 6.

FIG. 5 is a schematic structural diagram of a network device according to an embodiment of this application, for example, may be a schematic structural diagram of a base station. The base station 2000 may be used in the system shown in FIG. 1, to perform a function of the network device in the foregoing method embodiment. As shown in the figure, the base station 2000 may include one or more radio frequency units, for example, one or more remote radio units (RRUs) 2100, and one or more baseband units (BBUs) (which may also be referred to as distributed units (DUs)) 2200. The RRU 2100 may be referred to as a transceiver unit or a communication unit, and corresponds to the transceiver unit 1100 in FIG. 4. Optionally, the transceiver unit 2100 may also be referred to as a transceiver, a transceiver circuit, a transceiver machine, or the like, and may include at least one antenna 2101 and a radio frequency unit 2102. Optionally, the transceiver unit 2100 may include a receiving unit and a sending unit. The receiving unit may correspond to a receiver (which is also referred to as a receiver machine or a receiver circuit), and the sending unit may correspond to a transmitter (which is also referred to as a transmitter machine or a transmitter circuit). The RRU 2100 is mainly configured to: send and receive a radio frequency signal and perform conversion between the radio frequency signal and a baseband signal. The BBU 2200 is mainly configured to: perform baseband processing, control the base station, and so on. The RRU 2100 and the BBU 2200 may be physically disposed together, or may be physically separated, namely, a distributed base station.

The BBU 2200 is a control center of the base station, and may also be referred to as a processing unit. The BBU 2200 may correspond to the processing unit 1200 in FIG. 4, and is mainly configured to implement a baseband processing function, for example, channel coding, multiplexing, modulation, or spreading. For example, the BBU (the processing unit) may be configured to control the base station to perform an operation procedure related to the network device in the foregoing method embodiment.

In an example, the BBU 2200 may include one or more boards, and a plurality of boards may jointly support a radio access network (such as an LTE network) having a single access standard, or may separately support radio access networks (such as an LTE network, a 5G network, or another network) having different access standards. The BBU 2200 further includes a memory 2201 and a processor 2202. The memory 2201 is configured to store necessary instructions and data. The processor 2202 is configured to control the base station to perform a necessary action, for example, configured to control the base station to perform an operation procedure related to the network device in the foregoing method embodiment. The memory 2201 and the processor 2202 may serve one or more boards. In other words, a memory and a processor may be independently disposed on each board. Alternatively, a plurality of boards may share a same memory and a same processor. In addition, a necessary circuit may be further disposed on each board.

It should be understood that the base station 2000 shown in FIG. 5 can implement each process related to the network device in the foregoing method embodiment. Operations or functions of the modules in the base station 2000 are respectively intended to implement corresponding procedures in the foregoing method embodiment. For details, refer to the descriptions in the foregoing method embodiment. To avoid repetition, detailed descriptions are appropriately omitted herein.

The BBU 2200 may be configured to perform an action that is implemented inside the network device and that is described in the foregoing method embodiment, and the RRU 2100 may be configured to perform an action of receiving or sending that is performed by the network device from or to the terminal device and that is described in the foregoing method embodiment. For details, refer to the descriptions in the foregoing method embodiment. Details are not described herein again.

FIG. 6 is a schematic structural diagram of a terminal device 3000 according to an embodiment of this application. As shown in the figure, the terminal device 3000 includes a processor 3001 and a transceiver 3002. Optionally, the terminal device 3000 may further include a memory 3003. The processor 3001, the transceiver 3002, and the memory 3003 may communicate with each other through an internal connection path, and transfer a control signal and/or a data signal. The memory 3003 is configured to store a computer program. The processor 3001 is configured to: invoke the computer program from the memory 3003 and run the computer program, to control the transceiver 3002 to receive and send a signal.

The processor 3001 and the memory 3003 may be integrated into one processing apparatus 3004. The processor 3001 is configured to execute program code stored in the memory 3003 to implement the foregoing functions. It should be understood that the processing apparatus 3004 shown in the figure is merely an example. During specific implementation, the memory 3003 may alternatively be integrated into the processor 3001, or may be independent of the processor 3001. This is not limited in this application.

The terminal device 3000 may further include an antenna 3010, configured to send, by using a radio signal, uplink data or uplink control signaling output by the transceiver 3002.

It should be understood that, the terminal device 3000 shown in FIG. 6 can implement each process related to the terminal device in the foregoing method embodiment. Operations or functions of the modules in the terminal device 3000 are respectively intended to implement corresponding procedures in the foregoing method embodiment. For details, refer to the descriptions in the foregoing method embodiment. To avoid repetition, detailed descriptions are appropriately omitted herein.

Optionally, the terminal device 3000 may further include a power supply 3005, configured to supply power to various components or circuits in the terminal device.

In addition, to make functions of the terminal device more perfect, the terminal device 3000 may further include one or more of an input unit 3006, a display unit 3007, an audio circuit 3008, a camera 3009, a sensor 3008, and the like, and the audio circuit may further include a speaker 30081, a microphone 30082, and the like.

It should be understood that the processing apparatus 3004 or the processor 3001 may be a chip. For example, the processing apparatus 3004 or the processor 3001 may be a field programmable gate array (FPGA), or may be a general-purpose processor, a digital signal processor (DSP), an application specific integrated circuit (ASIC), a field programmable gate array (FPGA) or another programmable logic device, a discrete gate or a transistor logic device, a discrete hardware component, may be a system on chip (SoC), may be a central processing unit (CPU), may be a network processor (NP), may be a digital signal processing circuit (DSP), may be a micro controller unit (MCU), and may be a programmable controller (PLD) or another integrated chip. The general-purpose processor may be a microprocessor, or the processor may be any conventional processor or the like. Steps of the method disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

The memory 3003 may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that the memories in the system and method described in this specification include but are not limited to these memories and any memory of another appropriate type.

This application further provides a computer program product. The computer program product includes computer program code. When the computer program code is run on a computer, the computer is enabled to perform the method performed by the terminal device (the transmit end or the receive end) or the network device in the foregoing method embodiment.

This application further provides a computer-readable medium. The computer-readable medium stores program code. When the program code is run on a computer, the computer is enabled to perform the method performed by the network device or the terminal device in the foregoing method embodiment.

This application further provides a system, including a terminal device and a network device.

An embodiment of this application further provides a processing apparatus, including a processor and an interface. The processor is configured to perform the method performed by the terminal device or the network device in any one of the foregoing method embodiments.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, or a computer. As shown in figures, both a computing device and an application that runs on the computing device may be components. One or more components may reside within a process or a thread of execution, and a component may be located on one computer or distributed between two or more computers. In addition, these components may be executed from various computer-readable media that store various data structures. For example, the components may perform communication by using a local or remote process and based on, for example, a signal having one or more data packets (for example, data from two components interacting with another component in a local system, a distributed system, or across a network such as the internet interacting with other systems by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. Moreover, the particular features, structures, or characteristics may be combined in one or more embodiments in any appropriate manner.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that in this application, "at least one" means one or more, and "a plurality of" means two or more.

It should be further understood that in embodiments of this application, "B corresponding to A" indicates that B is associated with A, and B may be determined based on A. However, it should be further understood that determining B based on A does not mean that B is determined based on only A. B may alternatively be determined based on A and/or other information.

It should be further understood that the term "and/or" in this specification describes only an association relationship between associated objects and indicates that three relationships may exist. For example, A and/or B may indicate the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C, and C; and other combinations of A, B, and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
determining, by a terminal device, a transport block size of a data channel based on a quantity of available resource elements $N_{RE}'$ of the data channel in a physical resource block, wherein
$N_{RE}'=N_{SC}^{RB}(N_{syml}^{sh}-1_\alpha)-N_{DMRS}^{PRB}-N_{oh}^{PRB}$,
$N_{syml}^{sh}=N_{syml}-2$,
$N_{syml}$ indicates a quantity of symbols used for sidelink communication in a slot,
$N_{SC}^{RB}=12$ indicates a quantity of subcarriers in the physical resource block is 12,
$N_{DMRS}^{PRB}$ indicates an overhead of a demodulation reference signal on an encoded symbol in the physical resource block,
$N_{oh}^{PRB}$ is configured by a higher layer, and
$1_\alpha$ is determined based on a configured period of a physical sidelink feedback channel.

2. The method according to claim 1, wherein the method further comprises:
sending or receiving, by the terminal device, first indication information, wherein the first indication information indicates a value of the $1_\alpha$.

3. The method according to claim 2, wherein the configured period is two slots or four slots, and wherein the first indication information indicates that the $1_\alpha$ is 3.

4. The method according to claim 2, wherein the first indication information is carried in sidelink control information (SCI).

5. The method according to claim 1, wherein the configured period of the physical sidelink feedback channel is one slot, and wherein the $1_\alpha$ is 3.

6. The method according to claim 1, wherein the configured period of the physical sidelink feedback channel is 0, and wherein the $1_\alpha$ is 0.

7. The method according to claim 1, wherein the configured period of the physical sidelink feedback channel is configured by a network device.

8. An apparatus, comprising:
one or more processors, and
a non-transitory storage medium in communication with the one or more processors, wherein the non-transitory storage medium stores program instructions, and wherein, when executed by the one or more processors, the program instructions cause the apparatus to perform:
determining a transport block size of a data channel based on a quantity of available resource elements $N_{RE}'$ of the data channel in a physical resource block, wherein
$N_{RE}'=N_{SC}^{RB}(N_{syml}^{sh}-1_\alpha)-N_{DMRS}^{PRB}-N_{oh}^{PRB}$,
$N_{syml}^{sh}=N_{syml}-2$,
$N_{syml}$ indicates a quantity of symbols used for sidelink communication in a slot,
$N_{SC}^{RB}=12$ indicates a quantity of subcarriers in the physical resource block is 12,
$N_{DMRS}^{PRB}$ indicates an overhead of a demodulation reference signal on an encoded symbol in the physical resource block,
$N_{oh}^{PRB}$ is configured by a higher layer, and
$1_\alpha$ is determined based on a configured period of a physical sidelink feedback channel.

9. The apparatus according to claim 8, wherein the program instructions further cause the apparatus to perform:
receiving or sending first indication information, wherein the first indication information indicates a value of the $1_\alpha$.

10. The apparatus according to claim 9, wherein the configured period is two slots or four slots, and wherein the first indication information indicates that the $1_\alpha$ is 3.

11. The apparatus according to claim 9, wherein the first indication information is carried in sidelink control information (SCI).

12. The apparatus according to claim 8, wherein the configured period of the physical sidelink feedback channel is one slot, and wherein the $1_\alpha$ is 3.

13. The apparatus according to claim 8, wherein the configured period of the physical sidelink feedback channel is 0, and wherein the $1_\alpha$ is 0.

14. The apparatus according to claim 8, wherein the configured period of the physical sidelink feedback channel is configured by a network device.

15. A non-transitory storage medium, the non-transitory storage medium storing program instructions, wherein the program instructions, when executed by an apparatus, cause the apparatus to perform:
determining a transport block size of a data channel based on a quantity of available resource elements $N_{RE}'$ of the data channel in a physical resource block, wherein
$N_{RE}'=N_{SC}^{RB}(N_{syml}^{sh}-1_\alpha)-N_{DMRS}^{PRB}-N_{oh}^{PRB}$,
$N_{syml}^{sh}=N_{syml}-2$, $N_{syml}$ indicates a quantity of symbols used for sidelink communication in a slot, $N_{SC}^{RB}=12$ indicates a quantity of subcarriers in the physical resource block is 12, $N_{DMRS}^{PRB}$ indicates an overhead of a demodulation reference signal on an encoded symbol in the physical resource block, $N_{oh}^{PRB}$ is configured by a higher layer, and $l_\alpha$ is determined based on a configured period of a physical sidelink feedback channel.

16. The non-transitory storage medium according to claim 15, wherein the program instructions further cause the apparatus to perform:

receiving or sending first indication information, wherein the first indication information is used to indicate a value of the $l_\alpha$.

17. The non-transitory storage medium according to claim 16, wherein the configuration period is two slots or four slots, and wherein the first indication information indicates that the $l_\alpha$ is 3.

18. The non-transitory storage medium according to claim 16, wherein the first indication information is carried in sidelink control information (SCI).

19. The non-transitory storage medium according to claim 15, wherein the configuration period of the physical sidelink feedback channel is one slot, and wherein the $l_\alpha$ is 3.

20. The non-transitory storage medium according to claim 15, wherein the configuration period of the physical sidelink feedback channel is 0, and wherein the $l_\alpha$ is 0.

21. The non-transitory storage medium according to claim 15, wherein the configured period of the physical sidelink feedback channel is configured by a network device.

* * * * *

UNITED STATES PATENT AND TRADEMARK OFFICE
CERTIFICATE OF CORRECTION

PATENT NO. : 12,218,883 B2
APPLICATION NO. : 17/819425
DATED : February 4, 2025
INVENTOR(S) : Guo et al.

Page 1 of 2

It is certified that error appears in the above-identified patent and that said Letters Patent is hereby corrected as shown below:

In the Specification

In Column 15, Line 18, delete "$I_\alpha=N$" and insert -- $I_\alpha=3/N$. N --.

In Column 16, Line 12, delete "woo" and insert -- 1000 --.

In Column 16, Line 21, delete "woo" and insert -- 1000 --.

In Column 16, Line 23, delete "woo" and insert -- 1000 --.

In Column 16, Line 27, delete "woo" and insert -- 1000 --.

In Column 16, Line 63, delete "woo" and insert -- 1000 --.

In Column 16, Line 64, delete "woo" and insert -- 1000 --.

In Column 17, Line 1, delete "woo" and insert -- 1000 --.

In Column 17, Lines 11-12, delete "$N_{syml}^{sh'}=N_{syml}^{sh}k \cdot 1_\alpha,$" and insert -- $N_{syml}^{sh'}=N_{syml}^{sh}-1_\alpha,$ --.

In Column 17, Line 38, delete "woo" and insert -- 1000 --.

In Column 17, Line 40, delete "woo" and insert -- 1000 --.

In Column 17, Line 43, delete "woo" and insert -- 1000 --.

In Column 17, Line 61, delete "woo" and insert -- 1000 --.

In Column 17, Line 62, delete "woo" and insert -- 1000 --.

Signed and Sealed this
Eighteenth Day of March, 2025

Coke Morgan Stewart
*Acting Director of the United States Patent and Trademark Office*

CERTIFICATE OF CORRECTION (continued)
U.S. Pat. No. 12,218,883 B2

In Column 17, Line 65, delete "woo" and insert -- 1000 --.

In Column 17, Line 67, delete "woo" and insert -- 1000 --.

In Column 18, Line 2, delete "woo" and insert -- 1000 --.

In Column 18, Line 4, delete "woo" and insert -- 1000 --.

In Column 18, Line 5, delete "woo" and insert -- 1000 --.

In Column 18, Line 8, delete "moo" and insert -- 1000 --.